(12) United States Patent
Todirel et al.

(10) Patent No.: US 12,111,749 B2
(45) Date of Patent: Oct. 8, 2024

(54) DEBUGGER SCRIPT EMBEDDED IN DEBUGGABLE PROGRAM SOURCE CODE

(71) Applicant: Microsoft Technology Licensing, LLC, Redmond, WA (US)

(72) Inventors: Ion Todirel, Bellevue, WA (US); Bogdan Ionut Mihalcea, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 116 days.

(21) Appl. No.: 18/177,666

(22) Filed: Mar. 2, 2023

(65) Prior Publication Data
US 2024/0296107 A1    Sep. 5, 2024

(51) Int. Cl.
| | |
|---|---|
| G06F 9/44 | (2018.01) |
| G06F 9/445 | (2018.01) |
| G06F 9/455 | (2018.01) |
| G06F 11/00 | (2006.01) |
| G06F 11/36 | (2006.01) |

(52) U.S. Cl.
CPC ...... *G06F 11/3624* (2013.01); *G06F 11/3632* (2013.01)

(58) Field of Classification Search
CPC .. G06F 11/3624; G06F 11/3632; G06F 8/656; G06F 16/80; G06F 11/3696; G06F 11/3688; G06F 9/4484; G06F 11/3664; G06F 11/3684
See application file for complete search history.

(56) References Cited

U.S. PATENT DOCUMENTS

| | | | |
|---|---|---|---|
| 8,196,108 B2 * | 6/2012 | Bennet | G06F 11/3664 717/124 |
| 2004/0210876 A1 | 10/2004 | Stall et al. | |
| 2007/0300213 A1 | 12/2007 | Adolphson | |
| 2018/0024911 A1 | 1/2018 | Kruszewski et al. | |

OTHER PUBLICATIONS

"µVision User's Guide: Debug Scripting", retrieved from << https://developer.arm.com/documentation/101407/0538/Debugging/Debug-Scripting >>, 5 pages, no later than Feb. 4, 2023.
(Continued)

*Primary Examiner* — Thuy Dao
(74) *Attorney, Agent, or Firm* — Ogilvie Law Firm

(57) ABSTRACT

An enhanced compiler recognizes debug script which is embedded with program statements in a source code, and emits compiled code containing various debugger command instructions among program instructions. Embedded commands are not limited to break or assert statements. Different portions of a program's compiled code are either tailored for debugging or else performance optimized, depending on the location and kind of embedded debug script statements. Debugger commands for debugging race conditions, intermittent bugs, mutation testing code versions, and other complex development challenges are documented and versioned as part of the source code. Program process execution paths are chosen based on call stack search results, touch counts, breakpoint status, and other data accessed via a debugger. Debug script statements are categorized and utilized to balance debugging support against performance optimization in code from a source generator, or just-in-time code.

20 Claims, 4 Drawing Sheets

---

ENHANCED SYSTEM 102, 202 WITH SOURCE-EMBEDDED DEBUG SCRIPT FUNCTIONALITY 204

MEMORY/MEDIA 112, 114

COMPILER 122 TO RECOGNIZE 302 DEBUGGER SCRIPT STATEMENT 304, EMIT 306 DEBUGGER INSTRUCTION 308 AND PROGRAM INSTRUCTIONS 310

CODE 132 OPTIMIZER 312  |  OPTIMIZATION CONTROLLER 314  |  DEBUGGER UTILIZATION CONFIGURATION 316 CONTROL 318

PROCESSOR 110  |  PROGRAM PROCESS 320  |  INTERFACE(S) 322

(56) References Cited

OTHER PUBLICATIONS

"µVision User's Guide: Debug Commands", retrieved from << https://developer.arm.com/documentation/101407/0538/Debug-Commands >>, 5 pages, no later than Feb. 4, 2023.
"µVision User's Guide: User Functions", retrieved from << https://developer.arm.com/documentation/101407/0538/Debug-Functions/User-Functions >>, 3 pages, no later than Feb. 4, 2023.
"Automate E-mail Information Extraction from Outlook into Excel Using VBA", retrieved from << https://www.dalesandro.net/automate-e-mail-information-extraction-from-outlook-into-excel-using-vba/ >>, 13 pages, no later than Feb. 4, 2023.
"C preprocessor", retrieved from << https://en.wikipedia.org/wiki/C_preprocessor >>, 10 pages, Jan. 29, 2023.
"Lua (programming language)", retrieved from << https://en.wikipedia.org/wiki/Lua_(programming_language) >>, 15 pages, Feb. 4, 2023.
"Cross compiler", retrieved from << https://en.wikipedia.org/wiki/Cross_compiler >>, 9 pages, Jan. 20, 2023.
"Race condition", retrieved from << https://en.wikipedia.org/wiki/Race_condition >>, 11 pages, Oct. 13, 2022.
Leon Wu, Gail Kaiser, Constructing Subtle Concurrency Bugs Using Synchronization-Centric Second-Order Mutation Operators >>, 6 pages, no later than Dec. 31, 2011.
"Record and replay debugging", retrieved from << https://en.wikipedia.org/wiki/Record_and_replay_debugging >>, Aug. 18, 2022, 2 pages.
"Debugger", retrieved from << https://en.wikipedia.org/wiki/Debugger >>, Dec. 15, 2022, 5 pages.
"Profiling (computer programming)", retrieved from << https://en.wikipedia.org/wiki/Profiling_(computer_programming) >>, Jan. 25, 2023, 7 pages.
"Polyglot (computing)", retrieved from << https://en.wikipedia.org/wiki/Polyglot_(computing) >>, Jan. 9, 2023, 6 pages.
"Debug.Assert Method", retrieved from << https://learn.microsoft.com/en-us/dotnet/api/system.diagnostics.debug.assert?view=net-7.0 >>, no later than Feb. 4, 2023, 17 pages.
"Debugging the Service Application Automatically", retrieved from << https://learn.microsoft.com/en-us/windows-hardware/drivers/debugger/debugging-the-service-application-automatically >>, Dec. 14, 2021, 2 pages.
"Optimizing compiler", retrieved from << https://en.wikipedia.org/wiki/Optimizing_compiler >>, Oct. 9, 2022, 13 pages.
"Stepping (debugging)", retrieved from << https://en.wikipedia.org/wiki/Stepping_(debugging) >>, Jun. 6, 2022, 3 pages.
Jose Pablo Pinilla, "Source-Level Instrumentation fo In-System Debug of High-Level Synthesis Designs for FPGA", retrieved from << https://open.library.ubc.ca/media/download/pdf/24/1.0319056/4 >>, no later than Sep. 30, 2016, 119 pages.
Kevin S. Templer and Clinton L. Jeffery, "A Configurable Automatic Instrumentation Tool for ANSI C", retrieved from << http://www2.cs.uidaho.edu/~jeffery/alamo/ase.pdf >>, 9 pages, Oct. 13-16, 1998.
"Build and run your app", retrieved from << https://developer.android.com/studio/run >>, Jan. 24, 2023, 20 pages.
"Automatic parallelization", retrieved from << https://en.wikipedia.org/wiki/Automatic_parallelization >>, Mar. 23, 2022, 5 pages.
"Intrinsic function", retrieved from << https://en.wikipedia.org/wiki/Intrinsic_function >>, Jul. 13, 2022, 3 pages.
"Step through code", retrieved from << https://www.jetbrains.com/help/rider/Stepping_Through_the_Program.html >>, Jun. 27, 2022, 22 pages.
"Call stack", retrieved from << https://en.wikipedia.org/wiki/Call_stack >>, Jan. 9, 2023, 8 pages.
"First look at the Visual Studio Debugger", retrieved from << https://learn.microsoft.com/en-us/visualstudio/debugger/debugger-feature-tour?view=vs-2022 >>, Sep. 22, 2022, 12 pages.
"Debugging techniques and tools to help you write better code", retrieved from << https://learn.microsoft.com/en-us/visualstudio/debugger/write-better-code-with-visual-studio?view=vs-2022 >>, Sep. 1, 2022, 14 pages.
Michael Haberman, "Tracing: Why Logs Aren't Enough to Debug Your Microservices", retrieved from << https://thenewstack.io/tracing-why-logs-arent-enough-to-debug-your-microservices/ >>, Jun. 9, 2021, 15 pages.
"Type introspection", retrieved from << https://en.wikipedia.org/wiki/Type_introspection >>, Dec. 10, 2022, 6 pages.
"Reflective programming", retrieved from << https://en.wikipedia.org/wiki/Reflective_programming >>, Jan. 28, 2023, 8 pages.
"Common Intermediate Language", retrieved from << https://en.wikipedia.org/wiki/Common_Intermediate_Language >>, Jan. 3, 2023, 8 pages.
"List of CIL instructions", retrieved from << https://en.wikipedia.org/wiki/List_of_CIL_instructions >>, Dec. 4, 2022, 11 pages.
"X86 assembly language", retrieved from << https://en.wikipedia.org/wiki/X86_assembly_language >>, Feb. 13, 2023, 17 pages.
"X86 instruction listings", retrieved from << https://en.wikipedia.org/wiki/X86_instruction_listings >>, Feb. 18, 2023, 70 pages.
"INT (x86 instruction)", retrieved from << https://en.wikipedia.org/wiki/INT_(x86_instruction) >>, Aug. 16, 2022, 2 pages.
Eli Bendersky, "How debuggers work: Part 2—Breakpoints", retrieved from << https://eli.thegreenplace.net/2011/01/27/how-debuggers-work-part-2-breakpoints >>, Jan. 27, 2011, 13 pages.
"DebugBreak function (debugapi.h)", retrieved from << https://learn.microsoft.com/en-us/windows/win32/api/debugapi/hf-debugapi-debugbreak >>, Jun. 29, 2021, 2 pages.
"Debugbreak", retrieved from << https://learn.microsoft.com/en-us/cpp/intrinsics/debugbreak?view=msvc-170 >>, Aug. 3, 2021, 2 pages.
"Alphabetical listing of intrinsic functions", retrieved from << https://learn.microsoft.com/en-us/cpp/intrinsics/alphabetical-listing-of-intrinsic-functions?view=msvc-170 >>, Nov. 22, 2021, 7 pages.
"Compiler intrinsics", retrieved from << https://learn.microsoft.com/en-us/cpp/intrinsics/compiler-intrinsics?view=msvc-170 >>, Aug. 3, 2021, 2 pages.
"16.6. Conditional Breakpoints", retrieved from << https://www.it.uc3m.es/pbasanta/asng/course_notes/debugger_condbreak_en.html >>, no later than Dec. 31, 2017, 4 pages.
"Java Compiler Performance Comparison", retrieved from << http://www.nullstone.com/htmls/results/java.htm >>, no later than Dec. 31, 2002, 5 pages.
International Search Report and Written Opinion received for PCT Application No. PCT/US2024/017197, Jun. 12, 2024, 15 pages.
KMS, et al., "2022 Guide to Artificial Intelligence Software Development", Retrieved from the URL: https://kms-technology.com/software-development/2022-guide-to-artificial-intelligence-software-development.html, Jun. 9, 2022, pp. 1-13.

* cited by examiner

Fig. 4

SOME ADDITIONAL ASPECTS OF SOURCE-EMBEDDED DEBUGGER SCRIPT 210

- DEBUGGER SCRIPTING LANGUAGE 402
- PROGRAM STATEMENT 404
- OPTIMIZATION 406
- DEBUG SCRIPT PRESENCE / ABSENCE 408 / 410
- COMPUTATIONAL RESOURCE 412 USAGE 414
- EXECUTION SPEED 416
- PASS-CONTROL-AND-RETURN 418
- PROGRAMMING LANGUAGE 420
- PASS-CONTROL-AND-OBEY 422
- (CONDITIONAL) BREAKPOINT (424) 426
- JUST-IN-TIME (JIT) 428
- STACK 430
- COMMAND 432 SOURCE 434
- AHEAD-OF-TIME (AOT) 436
- HEAP 438
- ROUTINE 440
- COMMENT 442
- RESERVED WORD 444
- DELIMITER 446
- SYNTAX 448 DIFFERENCE 450
- PARSE 452 TOKEN 454
- LOOP 456
- SEMANTIC 458 DIFFERENCE 460
- BREAK 462 STATEMENT 464
- INTRINSIC FUNCTION 466
- STEP 468 STATEMENT 470
- DEBUGGER OPERATION 472
- CONTROL 474 STATEMENT 476
- DEBUGGING: TELEMETRY 478, SESSION 480
- LANGUAGE 402 LIBRARY 482

Fig. 5

SOME ADDITIONAL ASPECTS OF A PROGRAM PROCESS 320

- DEBUGGER TRACE 502
- PROCESS STATE 504
- RACE CONDITION 506
- INTERMITTENT BUG 508
- DEADLOCK 510
- HANGING THREAD 512
- SECURITY VULNERABILITY 514
- EXCEPTION 516
- INFINITE LOOP 518
- MUTATION TEST 520
- VARIABLE 524
- DEBUGGER ATTACHMENT STATUS 522

DEBUGGER SCRIPT EMBEDDED IN DEBUGGABLE PROGRAM SOURCE CODE

BACKGROUND OF THE INVENTION

Many modern devices in a broad range of fields have some form of computing power, and operate according to software instructions that execute using that computing power. A few of the many examples of devices whose behavior depends on software include cars, planes, ships and other vehicles, robotic manufacturing tools and other industrial systems, medical devices, cameras, inventory management and other retail or wholesale systems, smartphones, tablets, servers, workstations and other devices which connect to the Internet.

The firmware, operating systems, applications and other software programs which guide various behaviors of these and many other computing devices are developed by people who may be known as developers, programmers, engineers, or coders, for example, but are referred to collectively here as "developers". Developers interact with source code editors, compilers, debuggers, profilers and various other software development tools as they develop software, with widespread beneficial effects.

Although many advances have been made, improvements in the computer technologies which are utilized for software development or for software execution remain possible, and are worth pursuing.

SUMMARY OF THE INVENTION

Some embodiments described herein include an enhanced compiler which recognizes a debugger script statement embedded among program statements in a source code. The source code includes both the debugger script statement and the program statements. The compiler implements the debugger script statement and also implements the program statements, by emitting suitable instructions for each as the source code is compiled. Program performance and program debuggability are each optimized.

In some cases, the debugger script statement is part of a multi-statement debugger script embedded in the source code. The debugger script is written in a debugger scripting language, whereas the program statements are written in a programming language that is different from the debugger scripting language.

In some cases, instructions which implement program statements for a portion of the source code are chosen by the compiler based on the presence of debugger script, or the presence of a particular kind of debugger script statement, or the absence of debugger script, within or near that portion of the source code.

In some cases, debugger operations performed during execution of the compiled code depend on previous debugger operations or depend on data obtained via the debugger, or both.

In some cases, problematic program process states which are not reproduced consistently by manually controlled debugging efforts are reliably reproduced using source-embedded debugger script functionality.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

BRIEF DESCRIPTION OF THE DRAWINGS

A more particular description will be given with reference to the attached drawings. These drawings only illustrate selected aspects and thus do not fully determine coverage or scope.

FIG. 4 is a block diagram illustrating some additional aspects of source-embedded debug script functionality;

FIG. 5 is a block diagram illustrating some additional aspects of a program process which executes a compiled program that has source-embedded debug script functionality;

DETAILED DESCRIPTION

Overview

Figure 1:
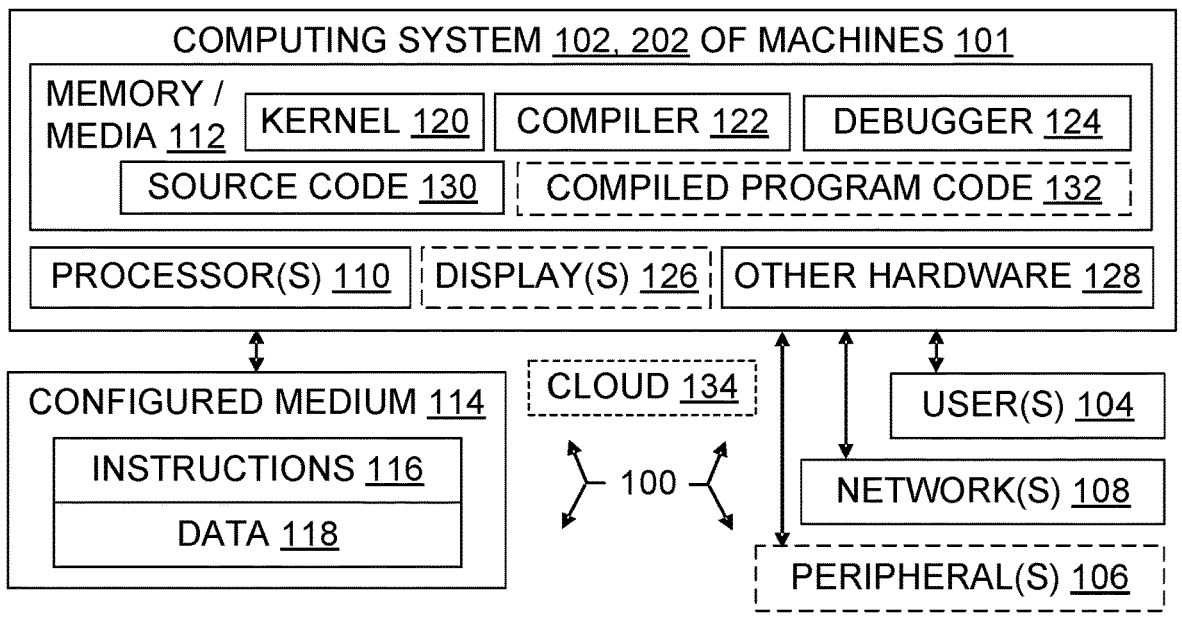
FIG. 1 is a diagram illustrating aspects of computer systems and also illustrating configured storage media, including some aspects generally suitable for systems which provide source-embedded debug script functionality.

Innovations may expand beyond their origins, but understanding an innovation's origins can help one more fully appreciate the innovation. In the present case, some teachings described herein were motivated by technical challenges faced by Microsoft innovators who were working to improve technology for understanding particularly difficult bugs, such as bugs associated with race conditions.

A race condition in a computing system occurs when the system's behavior depends on an event X or a state X occurring before an event Y or a state Y, but X does not reliably occur before Y. Race conditions can occur in computing hardware circuits, or in software. In some software scenarios, X is at the end of one execution path, e.g., in a first thread or a first program, while Y is at the end of another execution path, e.g., in a second thread or a second program. If the execution paths take different amounts of time than expected, due to unidentified differences in the code or in the code's execution context, then the order of occurrence of X and Y varies unpredictably. This unpredicted variation often leads to unwanted behavior of the computing system. For instance, assumptions in the software about the content of a shared variable may be intermittently wrong.

To fix the software by eliminating the race condition, a developer would try to understand the root cause of the race condition. The developer would likely begin by reviewing the source code. However, race conditions often have subtle causes that are not discovered by a code review alone. The developer's next step would be to try and examine code execution states, e.g., to find out which path execution takes through the code's branching control structures and which values the code's variables hold over time as the code executes.

One way to obtain execution state data of code is to print data to a log or to the screen as the code executes, e.g., using a print( ) statement or another tracing mechanism (a distinction may be made between logging and tracing, but for present purposes they are both treated as tracing). But tracing code to discover execution state data has several disadvantages. If the trace statements are placed manually by the developer, doing so burdens the developer, particularly since the resulting trace may not show the desired data. A trace may also include a large amount of output that is not helpful, e.g., if trace commands are scattered throughout large parts of the code. The code must also be recompiled to implement tracing as desired each time tracing commands are added, moved, or deleted in an effort to obtain more useful data and eliminate tracing data that is not helpful. Moreover, the presence of print( ) statements, logging statements, or other tracing in code changes the code's execution time, which can further obscure the cause of the race condition in the original version of the code that lacked the tracing.

Another way to obtain execution state data of code is for the developer to use a debugger. This has the advantage of not requiring insertion of multiple trace commands; the developer can simply insert breakpoints at locations of particular interest. If the code was compiled with a view toward debugging, then the code's execution state data can be examined at any chosen point in the code's execution without recompiling the code. However, pausing execution at a breakpoint will change execution time. Like trace commands, breakpoints can change the behavior the developer wants to understand. Moreover, compiling the code with a view toward debugging prevents code performance optimizations, so the code consumes more resources than necessary if the debug version is used as the production version. Compiling for debugging also potentially changes the behavior the developer wants to understand, if that behavior occurs in a non-debug version of the code.

In short, code review, tracing, and familiar debugging approaches each have some disadvantages when a developer is trying to understand the root cause of a race condition. Indeed, the same or similar disadvantages apply in other debugging scenarios that have painful workflows, such as scenarios that arise during mutation testing, and scenarios involving bugs that are difficult to reliably reproduce. "Painful" debugging workflows are workflows that include at least five recompilations driven by changes in debugging focus, or dozens of manually commanded step or continue debugger operations, or both.

A familiar program debugging workflow includes compiling a program for debug, starting a debugger, loading the program into the debugger, setting a breakpoint in the program's compiled code by indicating the breakpoint location to the debugger in the program's source code, commanding the debugger to run the program, hitting the breakpoint during program execution, and using the debugger to examine the program's state while the program's execution is paused at the breakpoint. In some development tools or some scenarios, the debugger is started before the program is compiled. In some cases, the program is already running, and when the program hits an exception the debugger is launched if it's not already running and is attached to the program, and the program's source code is loaded into the debugger. The exception operates like a breakpoint in the sense that program execution is paused at the exception and the debugger gives the developer access to the program's state at that point in the program's execution.

These debugging workflows, like other workflows, can be described from a developer point of view or from a computing system point of view. That is, for convenience a workflow may be described as a set of human actions, or be described as a corresponding set of machine actions. For instance, "the developer compiles a program" corresponds to "a compiler processes program source code input and produces compiled program code as output". Similarly, "the developer starts a debugger" corresponds to "the system receives a debugger launch command and in response launches a debugger". And so on; one of skill will understand which human actions correspond to which computing system actions, and vice versa, aided by the present disclosure. Nonetheless, all claims herein are directed only to machine actions. Human behavior is not claimed.

With a view toward painful debugging workflows, the innovators hypothesized that a compiler could be enhanced to recognize a debugger command in a program's source code, e.g., a command setting a breakpoint. Moreover, an entire debug script could be embedded inside source code. As the compiled code runs, the debugger will be invoked to aid in debugging the code, and as the code is debugged, the debugger will be managed at least in part using the embedded debug script commands.

Source-embedded debug script functionality differs from other approaches to debugging. Some familiar ways to control debuggers rely on mechanisms outside of the source code of a program that is being debugged, such as commands entered in a debugger manually by a developer, or debugger scripts that replay debugger commands. By contrast, source-embedded debug scripting beneficially creates a self-documenting connection between a particular part of the program's programming language source code and a particular debugger command. This aids code debuggability and maintainability. It also facilitates sharing reproducible bugs, and aids teaching and learning about the code. Moreover, when the source code program statements are version-controlled, e.g., through use of a source code repository, the debug script will likewise be version-controlled, in lockstep with the program statements.

Some familiar ways to control debuggers rely on post-compilation mechanisms. That is, the debugger command(s) used to control the debugging are determined after the particular code version to be debugged has been compiled. By contrast, source-embedded debug scripting beneficially creates a connection during compilation between a particular part of the source code and a particular debugger command. This permits a compiler to selectively optimize or not optimize different parts of the code, either for runtime performance or for debuggability, or for a balance of performance and debuggability. The compiler can optimize performance and skip work that supports debugging in the parts of the code that are not marked for debugging, and the compiler can facilitate debugging (sometimes at a significant program performance cost) in the parts of the program which are indicated for debugging by the embedded debug script. The size of debug data, such as .pdb files or debug symbols in an executable file, can also be reduced by selective optimization for debugging.

Moreover, source-embedded debug scripting helps developers replicate bugs in scenarios which are too complex for effective debugging to rely on tracing or on manually entered commands to a debugger. For example, assume a multi-thread program includes thread-A, thread-B, and thread-C. When the program is operating as desired, thread-A and thread-B will jointly produce data which is consumed by thread-C, which then either feeds the result back to thread-A and thread-B for additional processing or else outputs the result to a finished results file, depending on whether the result passes a sufficiency test. But the program is buggy. Due to an apparent race condition, results that are not sufficient are intermittently included in the finished results file. Also, thread-B is spending much longer than expected waiting for intermediate data from thread-A.

This multi-thread program with multiple bugs is one of many possible examples. Such architectures and such bugs are not uncommon, and they are very difficult to debug using familiar approaches. But with a source-embedded debug scripting functionality taught herein, breakpoints in thread-A and thread-B could be conditioned on how long thread-B has been waiting for intermediate data from thread-A, or on whether results being written to the finished results file are actually sufficient, or on whether the routine that includes the sufficiency test code appears as expected in the call stack for thread-C, or on a combination of these conditions or other conditions. Moreover, debugging code like this with source-embedded debug scripting functionality can be done with a speed and consistency that human-entered debugger commands cannot provide.

Realizing source-embedded debug scripting functionality does pose some technical challenges. One challenge is determining how the compiler will recognize debugger script that is embedded among programming language statements. Another technical challenge is how to define the allowable content of embedded debugger script, e.g., whether the script is limited to commands that could be entered manually, or has other capabilities as well. Another technical challenge is how to determine from the source code debug script statements and program statements whether to optimize compiled code for debugging or for performance, since performance optimization often degrades debugging and vice versa.

Some embodiments described herein utilize or provide an enhanced compiler which upon execution by a processor set performs a compilation on a source code, the compilation including: recognizing in the source code a debugger script statement written in a debugger scripting language, recognizing in the source code a program statement written in a programming language, emitting as part of the compiled program code a debugger instruction which implements the debugger script statement, and emitting as part of the compiled program code a program instruction which implements the program statement. In this context and elsewhere herein, unless stated otherwise "instruction" means one or more instructions. This enhanced compiler functionality has the technical benefit of implementing in compiled code a self-documented connection between a particular program statement and a particular debugger command, which aids code debuggability and maintainability, facilitates sharing reproducible bugs, aids teaching and learning about the code, and permits the compiler to selectively optimize or not optimize different parts of the compiled code, either for runtime performance or for debuggability.

In some embodiments, recognizing in the source code the debugger script statement includes recognizing the debugger script statement in a programming language comment in the source code. This has the technical benefit of allowing the same source code to also be compiled by a conventional compiler that lacks the capability of recognizing the debugger script statement and emitting the debugger instruction.

Some embodiments selectively optimize the compiled program code based the debugger script statement. In particular, some categorize the debugger script statement as a break statement or a step statement, and as a result prevent compiler performance optimization of a next programming language statement after the debugger script statement, while still performance optimizing other programming language statements of the source code. This has the technical benefit of facilitating debugging at the indicated portion of the code without paying the full performance cost for a debug version of the entire compiled code.

Some embodiments selectively optimize the compiled program code based the debugger script statement. In particular, some categorize the debugger script statement as a pass-control-and-return debugger script statement, and as a result optimize a next programming language statement after the debugger script statement. This has the technical benefit of facilitating debugging at the indicated portion of the code without paying the performance cost for a debug version of the next programming language statement after the debugger script statement.

In some embodiments, the debugger script statement includes a control flow statement which is dependent on data obtained via the debugger. In some examples, the data includes call stack data, heap data, or other execution state data. This has the technical benefit of improving developer productivity by tailoring the debug commands which are executed in a particular debug session to the execution state in that session of the code being debugged. This also helps developers replicate and examine bugs in complex scenarios such as race conditions, mutation testing, and intermittent bugs.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 134. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface 322 by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 134 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 218 include security tools or software apps, on mobile devices 102 or workstations 102 or servers 102, compilers 122 and debuggers 124 and other software development tools, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Unless stated otherwise, the compiler 122 and the debugger 124 are distinct tools, with neither contained within the other and with each capable of running usefully without the other running at all. However, in some embodiments an integrated development environment includes at least a compiler, a debugger, and a source code editor.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor a computer-readable storage device is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUS, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, source-embedded debug script functionality 204 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

In any later application that claims priority to the current application, reference numerals may be added to designate items disclosed in the current application. Such items may include, e.g., software, hardware, steps, processes, systems, functionalities, mechanisms, data structures, resources, languages, tools, workflows, or algorithm implementations, or other items in a computing environment, which are disclosed herein but not associated with a particular reference numeral herein. Corresponding drawings may also be added.

More About Systems

Figure 2:
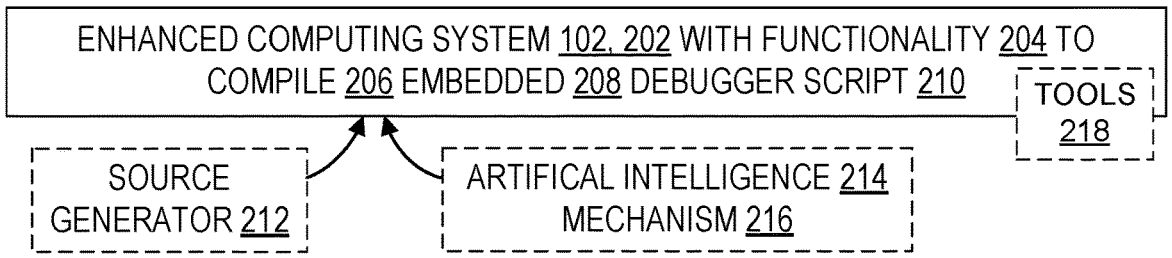
FIG. 2 is a block diagram illustrating an enhanced system configured with a source-embedded debug script functionality.

FIG. 2 illustrates a computing system 102 configured by one or more of the source-embedded debug script enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
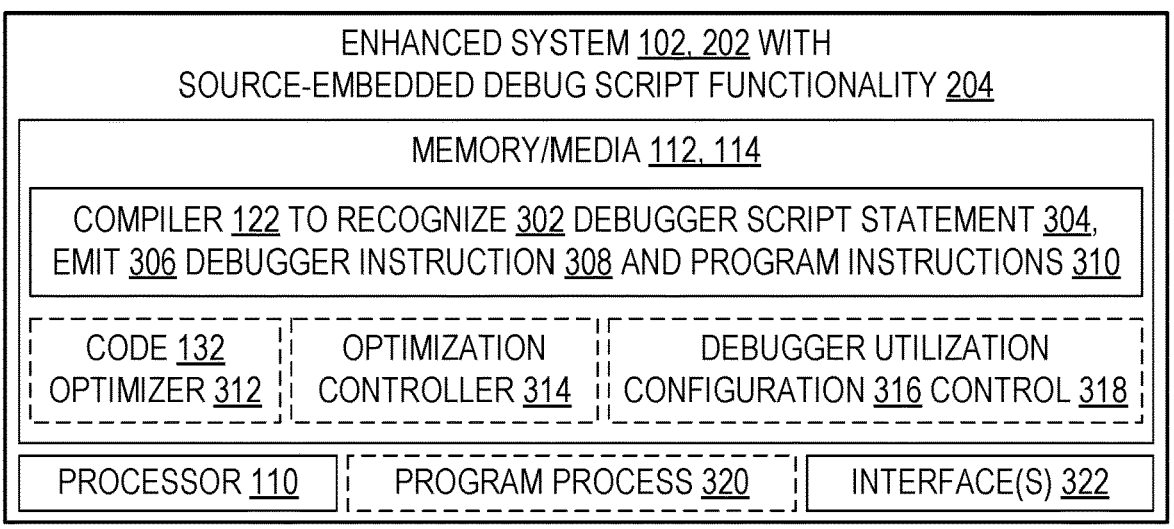
FIG. 3 is a block diagram illustrating aspects of a system enhanced with various aspects of source-embedded debug script functionality.

FIG. 3 shows some aspects of some enhanced systems 202. This is not a comprehensive summary of all aspects of enhanced systems 202 or all aspects of source-embedded debug script functionality 204. Nor is it a comprehensive summary of all aspects of an environment 100 or system 202 or other context of an enhanced system 202, or a comprehensive summary of all source-embedded debug script mechanisms 204 for potential use in or with a system 102. FIG. 3 items are discussed at various points herein, and additional details regarding them are provided in the discussion of a List of Reference Numerals later in this disclosure document.

FIG. 4 shows some additional aspects of source-embedded debug scripts 210. This is not a comprehensive summary of all additional aspects of source code 130, compilers 122, debuggers 124, debugging 716 workflows, or all aspects of source-embedded debug script functionality 204. FIG. 4 items are discussed at various points herein, and additional details regarding them are provided in the discussion of a List of Reference Numerals later in this disclosure document.

FIG. 5 shows some additional aspects of a program process 320. This is not a comprehensive summary of all additional aspects of compiled program code 132, debuggers 124, or debugging workflows. FIG. 5 items are discussed at various points herein, and additional details regarding them are provided in the discussion of a List of Reference Numerals later in this disclosure document.

Figure 6:
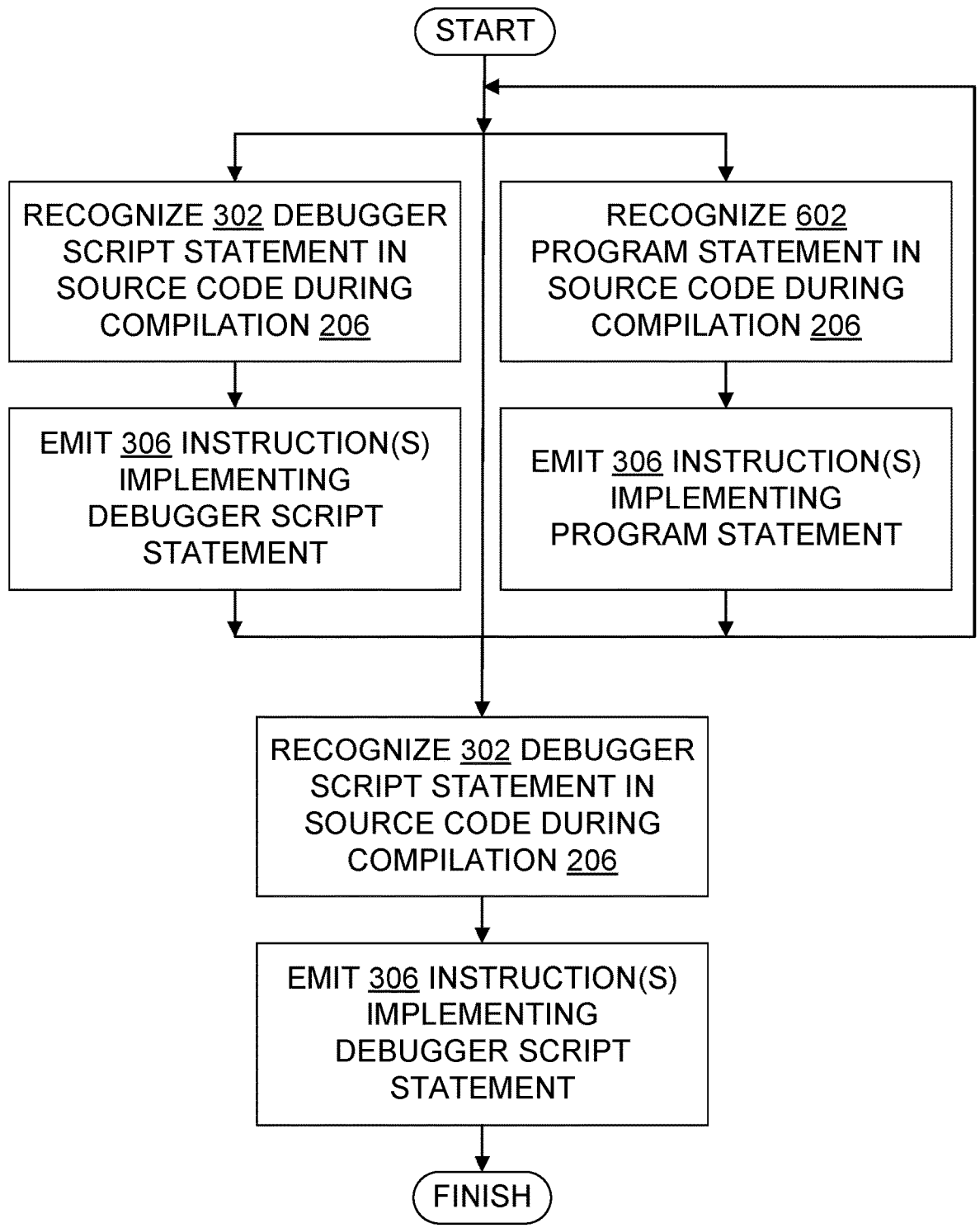
FIG. 6 is a flowchart illustrating steps in a source-embedded debugger script compilation method.
Figure 7:
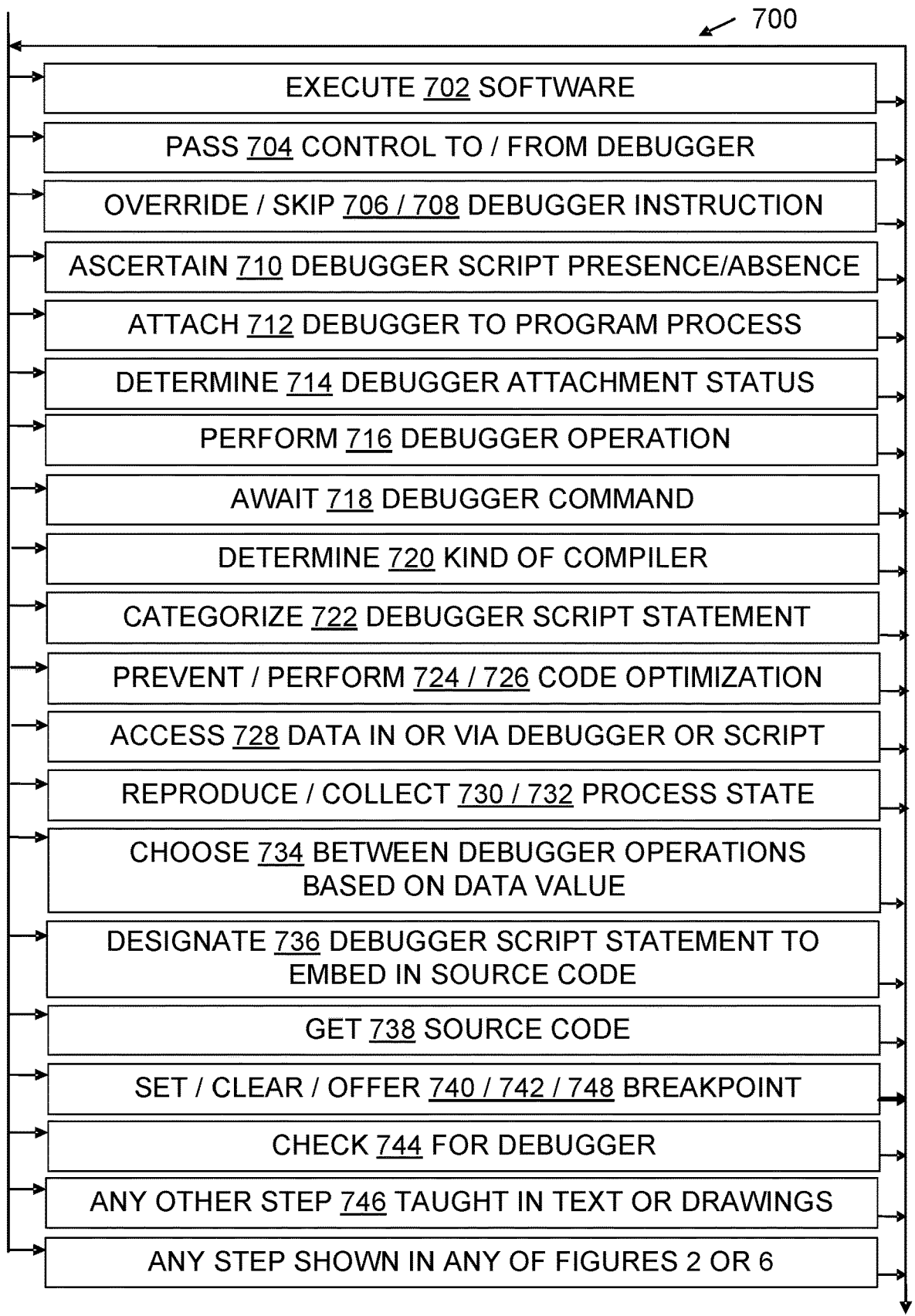
FIG. 7 is a flowchart further illustrating steps in some source-embedded debugger script compilation or execution methods, and incorporating FIG. 6.

The other figures are also relevant to systems 202. For example, FIGS. 6 and 7 illustrate methods of system 202 operation.

In some embodiments, the enhanced system 202 is networked through an interface 322. In some, an interface 322 includes hardware such as network interface cards, software such as network stacks, APIs, or sockets, combination items such as network connections, or a combination thereof.

Some embodiments include an enhanced compiler 122 that compiles source 130 which contains both debugger script 210 statements 304 and programming language 420 statements 404. The enhanced compiler may be implemented using a conventional compiler which is supplemented with a debug script compiler and which is modified to pass control to the debug script compiler when debug script is encountered instead of either ignoring the embedded debug script or treating it as an error. The resulting compiled program code 132 includes instructions 308, 116 implementing the debugger script and instructions 310, 116 implementing the programming language statements. Upon execution 702, the compiled program code checks 744 for a debugger; what happens in response to the check depends on the system's configuration 316.

Some embodiments include a computing system 202 which includes: a digital memory 112 and a processor set 110 including at least one processor, the processor set in operable communication with the digital memory. The system, which is configured to embed 208 a debugging hook 308 into a compiled program code 132, also includes a compiler 122 which upon execution by the processor set performs a compilation 206 of a source code 130. The compilation includes: recognizing 302 in the source code a debugger script statement 304 written in a debugger scripting language 402 which has a debugger scripting language syntax 448, recognizing 602 in the source code a program statement 404 written in a programming language 420 which has a programming language syntax 448 different from the debugger scripting language syntax 448, emitting 306 as part of the compiled program code a debugger instruction 308 which implements the debugger script statement, and emitting 306 as part of the compiled program code a program instruction 310 which implements the program statement.

For example, assume the source code includes a program statement to add two values. Assume the compiler generates x86 assembly language 132. The program instructions 310 include x86 assembly language instructions 116 to load the values into processor registers eax and edx, with an instruction to add the two values and put the result back into register eax, namely "add eax, edx". The debugger instruction 308 includes an x86 assembly language instruction 116 to interrupt execution and pass control to a debugger exception handler, e.g., an "int 3" instruction. This is one example; other registers, or other interrupts, or both could be used instead.

Note that a conventional approach to breakpoint insertion saves a copy of an instruction of compiled code, overwrites the saved instruction with the int 3 instruction, and eventually restores the compiled code by overwriting the int 3 with the saved instruction. By contrast, in this embodiment the int 3 is emitted during compilation. It does not overwrite another instruction of the compiled code; it is part of the compiled code before the debugger is launched or attached.

As another example, assume again that the source code includes a program statement to add two values, but in this case the compiler generates Common Intermediate Language (CIL) code 132. The program instructions 310 in this example include CIL instructions 116 to push the values onto a processing stack, pop them, add them, and push the result back onto the processing stack:

Idloc.0/push local variable 0 onto stack

Idloc. 1/push local variable 1 onto stack add/pop and add the top two stack items, push the result onto the stack stloc.0/pop and store the top stack item to local variable 0

The debugger instruction 308 in this example includes a CIL "break" instruction 116. As in the x86 assembly language example above, a conventional approach to breakpoint insertion saves a copy of a CIL instruction of the compiled code, e.g., the instruction following "stloc.0", overwrites the saved instruction with the break instruction, and eventually restores the compiled code by overwriting the break with the saved instruction. By contrast, in this embodiment the break is emitted during compilation; it is part of the compiled code before the debugger is launched or attached.

In some embodiments, the enhanced compiler 122 targets one or more parts of the source code 130 for optimization based on the embedded debugger script. The compiler 122 treats different parts of the source code differently with regard to optimization versus non-optimization, during the compilation 206.

In some embodiments, the compiler 122 includes a performance optimizer 312 which upon execution emits 306 program instructions 310 which are optimized with respect to execution speed 416 or computational resource usage 414 or both. In some cases, the system further includes at least one of: an optimization controller 314 which upon execution ascertains 710 an absence 410 of the debugger script statement in a portion of the source code and in response to the ascertained absence enables 726 a utilization of the performance optimizer during the compilation of the portion of the source code; or an optimization controller 314 which upon execution ascertains 710 a presence 408 of the debugger script statement in a portion of the source code and in response to the ascertained presence disables 724 a utilization of the performance optimizer during the compilation of the portion of the source code.

For example, in a scenario A the source code includes n=7 j=random.getstate( )

for i in range(0, n):

k=foo(i)+bar(j)

j=random.getstate( )

reveal(i, j, k)

break

In operation, the optimization controller 314 ascertains an absence of any debug script immediately before the random.getstate( ) calls as well as an absence of any debug script within the random.getstate( ) routine itself (code not shown). As a result, the random.getstate( ) routine and the calls to it are performance optimized. The optimization controller also ascertains the presence of the break debug script statement inside the for loop, so the for loop is not optimized.

In a variation, performance optimization is overridden 706. In some embodiments, an override commands the compiler to compile the entire program for debugging 716, or commands the compiler to compile the entire program with performance optimization enabled, regardless of the embedded debug script.

The scenario A code also illustrates placement of a debug script statement inside a programming language comment; the programming language comment starts at # and goes to the end of the line. The enhanced compiler recognizes 302 the debug script statement and emits one or more corresponding debug instructions 308, whereas a conventional compiler ignores the debug script statement just as it ignores the content of other comments. However, an enhanced compiler 122 may also recognize debug statements outside programming language comments in a given embodiment.

An embodiment may take various actions that depend on whether a debugger is attached and on other configuration data, e.g., system settings. Some embodiments include a program process 320 that is running 702 the compiled program code 132, and a debugger utilization configuration control 318. In some, the debugger utilization configuration control 318 is selectable between two or more of the following configurations 316.

In a first configuration, execution 702 of the emitted debugger instruction results in the computing system passing control 704 to a debugger 124 which was previously attached 712 to the program process.

In a second configuration, execution 702 of the emitted debugger instruction results in the computing system overriding 706 or skipping 708 an instruction to pass control 704 to a debugger which was previously attached to the program process.

In a third configuration, execution 702 of the emitted debugger instruction results in the computing system determining 714 no debugger is attached to the program process and then attaching 712 a debugger to the program process and passing control 704 to the debugger.

In a fourth configuration, execution 702 of the emitted debugger instruction results in the computing system determining 714 no debugger is attached to the program process and then continuing execution 702 of the program process without attaching a debugger to the program process.

Some embodiments include or utilize at least one of two categories of debugger script statements: pass-control-and-return 418, and pass-control-and-obey 422. The pass-control-and-return debugger script statements pass control 704 to the debugger, do something in the debugger (e.g., get or set a program value, set 740 or clear 742 a breakpoint 426 or a tracepoint), and then return control 704 to the program process 320. The pass-control-and-obey debugger script statements pass control 704 to the debugger, optionally do something in the debugger, and then wait 718 for a command 432 for the debugger to obey. More generally, in some embodiments executing 702 the debugger instruction which implements the debugger script statement in the compiled program code results in passing 704 control to a debugger.

In some embodiments, examples of pass-control-and-return 418 debug script statements 304 include one or more of a debugger command 432 to: set a breakpoint, set a tracepoint, clear a breakpoint, clear a tracepoint, set (write) a value of a variable of the program process which is identified in the source code, get (read) a value of a variable of the program process which is identified in the source code, search the stack 430 for a specified identifier and return a value indicating the search result, search the heap 438 for a specified identifier and return a value indicating the search result, or pause execution of the program process for a specified length of time then resume execution of the program process. Break statements and step statements are excluded from the pass-control-and-return 418 debug script statements 304, because a break or a step does not proactively return control 704 from the debugger back to the executing program process.

In some embodiments, examples of pass-control-and-obey 422 debug script statements 304 include one or more of a debugger command 432 to: break, step (including step over, step into, step out), exit from program process, or assert a condition and break into the debugger if the condition is false.

Some embodiments include a debugger. In some, the debugger script statement includes at least one of: a pass-control-and-return 418 debugger instruction 308 which upon execution results in the computing system passing control to the debugger, proactively performing a debugger operation, and then proactively returning control to the program process; or a pass-control-and-obey 422 debugger instruction 308 which upon execution results in the computing system passing control to the debugger, and the debugger waiting 718 for a command from a debugger command source 434 other than the program process 320. The debugger user interface 322 is such a source 434.

In some embodiments, a GUI library in invoked by the embedded debug script. Some embodiments perform on-the-fly graphic rendering which includes one or more pop ups, tool tips, modal dialogs, or render targets within the source code editor itself, providing the benefit of rich visualization and runtime self-visualization of the code. One such example implements a memory viewer of local variables strictly using the scripting language, without such a graphical feature being present in the debugger. Another example provides a visual display of memory layout of a data structure, specifying offsets of various bytes for data structure members or fields or other constituents. More generally, some embodiments include the computing system executing the compiled program code 132 in a program process, wherein the executing includes a debug instruction accessing a debug scripting language user interface library 482.

Some embodiments include or utilize at least one of two kinds of compilers and categorize debugger script statements based on the kind of compiler. In some embodiments, source code fed to a JIT 428 compiler, such as source code generated automatically at runtime by a source code generator 212, only contains pass-control-and-return debugger script statements. A presumption is that execution of JIT-compiled code does not usually get manually debugged. These pass-control-and-return statements are debugger script statements that pass control to the debugger, do something in the debugger, and then proactively return control to the program process. By contrast, source code fed to an AOT compiler is presumed in these embodiments to not infrequently use embedded debugger script to pass control to the debugger, optionally do something in the debugger, and then wait 718 for a command for the debugger to obey, e.g., a command 432 from a developer via the debugger's GUI 322.

Some embodiments are characterized in one of the following ways: the compiler 122 is a just-in-time compiler, and the debugger script statement is a pass-control-and-return 418 debugger script statement which upon compilation and execution results in the computing system passing control to the debugger, proactively performing a debugger operation per the debugger script statement, and then proactively returning control to the program process; or the compiler 122 is an ahead-of-time 436 compiler, the debugger script statement is a pass-control-and-obey 422 debugger script statement which upon compilation and execution results in the computing system passing control to the debugger, and the debugger waiting 718 for a command from a debugger command source other than the program process.

In some embodiments, the enhanced compiler 122 and the debugger 124 are part of an integrated development environment (IDE). In some, the debugger 124 is also enhanced, e.g., to send stack data or heap data or both to the program process, or to override or skip debugging commands based on a configuration 316 control 318. For example, the debugger may be configured to override or skip pass-control-and-obey 422 commands, in order to let the program process 320 run without waiting for manually entered commands and without removing the pass-control-and-obey 422 commands from the source code and recompiling.

Other system embodiments are also described herein, either directly or derivable as system versions of described processes or configured media, duly informed by the extensive discussion herein of computing hardware.

Although specific source-embedded debug script architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of source-embedded debug script functionality, for example, as well as different technical features, aspects, mechanisms, software, expressions, operational sequences, debug commands, data structures, generated languages such as assembly language or machine languages, programming languages, debug script statements, environment or system characteristics, or other functionality consistent with teachings provided herein, and may otherwise depart from the particular examples provided.

Processes (a.k.a. Methods)

Processes (which are also be referred to as "methods" in the legal sense of that word) are illustrated in various ways herein, both in text and in drawing figures. FIGS. 6 and 7 each illustrate a family of methods 600 and 700 respectively, which are performed or assisted by some enhanced systems, such as some systems 202 or another source-embedded debug script enhanced system as taught herein. Method family 600 is a proper subset of method family 700.

FIGS. 1 to 5 illustrate source-embedded debug script system 202 architectures with implicit or explicit actions, e.g., determining 720 whether a compiler is JIT or AOT, parsing 452 source code to recognize debug statements and program statements, creating or accessing internal compiler data structures such as abstract syntax trees, symbol tables, and intermediate representations, lexical analysis, static analysis, and other compilation 206 activities which do not necessarily involve debug statements, or otherwise processing data 118, in which the data 118 includes, e.g., source code 130, configuration settings, and compiled program code 132, among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types in source code 130. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 7. FIG. 7 is a supplement to the textual examples of embodiments provided herein and the textual descriptions of embodiments provided herein. In the event of any alleged inconsistency, lack of clarity, or excessive breadth due to an aspect or interpretation of FIG. 7, the text of this disclosure shall prevail over that aspect or interpretation of FIG. 7.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 700 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 7 to be non-operable, the sequence S is not within the scope of any claim. Any assertion otherwise is contrary to the present disclosure.

Some embodiments provide or utilize a method 700 performed by a computing system 202 to compile 206 a source code which includes embedded debugger script. The method includes recognizing 302 in the source code a debugger script statement 304 written in a debugger scripting language 402 which has a debugger scripting language syntax 448; recognizing 602 in the source code a program statement 404 written in a programming language 420 which has a programming language syntax 448 different from the debugger scripting language syntax 448; emitting 306 as part of a compiled program code 132 a debugger instruction 308 which implements the debugger script statement; and emitting 306 as part of the compiled program code a program instruction 310 which implements the program statement.

Depending on the embodiment and the script and optionally also on settings, the compiler 122 recognizes embedded debugger script in various ways. In some cases, source code contains a post and pre marker (delimiter 446) of the script, such as <script> </script>. More generally, the script is in free form, and the compiler infers the presence or absence of debug script based on what source code is parsed, including inferring where the script starts and where it ends. This is possible because the language 402 used for scripting is different syntactically, semantically, or both, from the language 420 used for the regular programming around the embedded script.

In some embodiments, recognizing 302 in the source code the debugger script statement includes at least one of the following: recognizing the debugger script statement in a programming language comment 442 in the source code; recognizing a debugger scripting language reserved word 444 in the source code; recognizing a debugger scripting language delimiter 446 in the source code; recognizing in the source code a difference 450 between a debugger scripting language syntax 448 and a programming language syntax 448; recognizing a semantic difference 460 between the debugger scripting language and the programming language; or recognizing a debugger scripting language token 454 in a parse 452 of the source code. In some embodiments, recognizing 302 the debugger script statement in the source code includes recognizing a compiler intrinsic function in the source code.

As to recognizing a compiler intrinsic function, a break debug command is available as a programming language statement in the form of a compiler intrinsic function in some environments. Asserts are programming language statements which test a condition and then break or not, depending on whether the condition is met.

In some embodiments, an enhanced compiler 122 implements and recognizes other debug commands as compiler intrinsic function calls 466, such as step commands or pass-control-and-return 418 commands. Recognizing compiler intrinsic function calls which are debug script statements 304 allows efficient implementation of more than a mere break command. Recognizing compiler intrinsic functions which are debug script statements 304 (as opposed to being programming language statements) also allows use of a single debug script language which is embedded in multiple programming languages and their compilers.

As to recognizing a debugger scripting language token 454 in a parse 452, a parse 452 includes for example a sequence of tokens resulting from lexical analysis or parsing or both, or an abstract syntax tree. Debug script control statements 476, for instance, may have different syntax 448 than corresponding programming language control statements 476, yet have the same or similar structure after parsing. A debug scripting language may use different keywords 444 than a programming language, for example, or different syntax for comments or for loops and other control statements.

Debug scripting languages have different semantics 458 than the programming languages they are embedded within. For instance, a programming language will often have type casting, loop constructions, exception handling, classes, object constructors, libraries, operators, and other semantic features different from the features present in a debug scripting language. Conversely, the debug scripting language will have debug commands that are not present in the programming language.

As to recognizing debug script in programming language comments 442, scenario A above provides one of many possible examples. Note that the debugger scripting language may also support comments, in the same syntax or a different syntax than the programming language. Different examples of source code 130 herein illustrate different syntax possibilities for comments and other aspects of languages 402, 420, to emphasize that various syntaxes 448 may be implemented for the programming language 420, the debug scripting language 402, or both, depending on the embodiment.

For example, in the following scenario B source code 130, programming language comments are indicated by # and debugger scripting language comments are indicated by /. A debug script comment containing "prepped?" is included in the debug script, which is itself embedded in the second programming language comment that begins "# if":

initialize the widget
seed=random.getstate( )
if (debugger.searchStack("prepper")<2) then debugger.
    break/prepped?
grow(seed)

The scenario B source code also illustrates a debug script flow control statement 476, namely an if statement. The debug scripting language includes "if" and "then" as reserved words 444. Depending on the embodiment, "debugger" may be a reserved word in the debug scripting language, or a library name or a reserved word in the programming language development environment. A given debug scripting language may instead or also support other control statements, such as switch statements, or loop statements, or both.

The scenario B source code also illustrates a conditional break statement 424. The "debugger.break" breakpoint is conditional, because whether it executes or not depends on the value given by evaluating the if statement's condition "debugger.searchStack("prepper")<2".

The first programming language comment containing "initialize the widget" does not result in any compiled program code, because the enhanced compiler treats it as a programming language comment and also does not recognize 302 any debug script in it.

In operation, program code 132 compiled from the scenario B source code first calls random.getstate( ) and then assigns the result of that call to seed. Then the compiled program code 132 executes a pass-control-and-return debug command "debugger.searchStack("prepper")" which passes control to the debugger, searches the stack 430 for the identifier "prepper" (or for a symbol table index corresponding to the identifier "prepper"), and returns an integer count that indicates how many times "prepper" (or its symbol table index) was found in the stack. If that return count is less than two, then the debugger is commanded to break. On the other hand, if the return count is two or greater, then the debugger.break command is not executed, and execution of the compiled program code 132 continues with the call to grow(seed).

In some embodiments, the compiler selectively optimizes the compiled program code 132 based on recognizing an embedded debugger script statement. Depending on the embodiment, some examples of optimization 406 by a compiler include function inlining, constant folding, loop unrolling, and vectorization. In some embodiments, selectively optimizing includes at least one of the following optimization options.

Optimization option one includes categorizing 722 the debugger script statement as a break statement 464 or a step statement 470, preventing 724 optimization of a next programming language statement after the debugger script statement, and optimizing 726 other programming language statements of the source code. A break script statement or a step script statement is treated by the embodiment as indicating a developer intent to use the debugger to examine what comes right after it in the source code, so the embodiment doesn't optimize the next code statement even though other statements are being optimized. As noted, "step" includes step, step into, step over, etc.

For example, a scenario C source code includes:

```
void c_function(int n) {
    debugger.break;
    for (int i = 0; i < n; i++) {
        if (n == 10) {
            debugger.break_for(10s) // break, wait for 10 seconds, continue
        }
    }
    debugger.step;
    another_c_function( );
}
```

In this example and this embodiment, the debugger.break debug script statement prevents optimization of the for loop, but does not prevent optimization of other program statements (not shown) that do not call c_function( ). Similarly, the debugger.step debug script statement prevents optimization of the routine another_c_function( ).

The debugger.break statement is a pass-control-and-obey 422 statement 304 because it does not proactively return control to the compiled code to start executing the for loop. Instead, the debugger will await a command specifying whether to continue execution or to perform some other debugger operation. The debugger.break_for(10 s) is presumptively a pass-control-and-return 418 statement because it does (after ten seconds) proactively return control to the compiled code to continue executing the for loop. However, it could alternatively be categorized differently, e.g., as a pass-control-and-return-after-delay statement.

Optimization option two includes categorizing 722 the debugger script statement as a pass-control-and-return 418 debugger script statement, and optimizing 726 a next programming language statement after the debugger script statement. The presence of the pass-control-and-return debugger script statement is treated by the embodiment as indicating a developer intent to do something that does not involve stepping. For instance, the developer intent may be indicated by a command for the system to get or set a memory value, add or remove a watch on a variable, activate or deactivate tracing, etc., without stepping. Accordingly, the embodiment goes ahead and optimizes the program near this debug script statement, e.g., the statement(s) following the debug script statement up to the next debug script statement or the end of the source code.

In some embodiments, the compiler selectively optimizes the compiled program code 132 based on embedded debugger script statement. Depending on the embodiment, selectively optimizing includes at least one of the following optimization options.

Optimization option three includes preventing 724 optimization 406 of a next programming language loop statement 456 after the debugger script statement, and optimizing 726 other programming language statements of the source code. The presence of the debugger script statement is treated by the embodiment as indicating a developer intent to maintain an ability to use the debugger to examine the loop, so the embodiment doesn't optimize the loop even though other statements are being optimized. For example, recognition 302 of the debugger.break statement 304 in the scenario C source code results in the embodiment preventing 724 optimization 406 of the for loop 456.

Optimization option four includes preventing 724 optimization 406 of a next routine 440 which is called after the debugger script statement, and optimizing 726 other programming language statements of the source code. The presence of the debugger script statement is treated by the embodiment as indicating a developer intent to maintain an ability to use the debugger to examine the routine, so the embodiment doesn't optimize the routine even though other statements are being optimized. For example, recognition 302 of the debugger.step statement 304 in the scenario C source code results in the embodiment preventing 724 optimization 406 of the routine another_c_function( ).

Tracking touches provides other examples of targeted optimization of code by an enhanced compiler which still allows portions of the code to be compiled for debugging. For instance, debugging 716 may be limited to tracking a loop counter. Then the compiler emits instructions to read 728 the loop counter but optimizes performance of the loop body. Similarly, touches of a function (calls to the function) can be monitored by a debug script while still optimizing performance of the function's body.

In some embodiments, debugger script control flow is based on data obtained from the debugger, e.g., by reading program state. For example, debug script control flow in the scenario B example includes an if statement 304 that controls execution flow of the debug script based on data obtained from the debugger by reading 728 program state in the stack 430 using the debug script invocation of debugger.searchStack( ). The debugger.searchStack( ) functionality could be implemented as a debug script library 482 function, or using a call to a stack search routine built into an enhanced debugger, for example.

Call stacks 430 are perhaps the most frequent example of data that is available in the debugger 124 but is not available (at least not easily) to the program 320 itself while it is running. The memory allocation heap 438 is another example. Many variables 524 are also easier to evaluate within a debugger than without the debugger when the evaluation is not part of the program statements. Some embodiments utilize execution of embedded debugger script to obtain data that is easily accessible in a debugger but harder to access outside the debugger.

In some embodiments the process being debugged and the debugger pass 704 control to each other. In some embodiments, the process being debugged and the debugger pass 728 data to each other. In some embodiments, the scripting language can alter the runtime values of any variables 524 in the heap 438, or any local variables 524 that are in scope. This may be used, e.g., for troubleshooting. Also, the debugger script is a compilable language; in some embodiments it has control 474 flow via if, switch, loop, or other statements, memory 112 allocation, state (variable 524 value, point in execution 702), and other characteristics of a Turing complete language.

These language capabilities raise various possibilities. In this scenario D source code example, embedded debugger script code only sets a breakpoint if the global variable foobar in the process 320 being debugged is true: if debugger.getGlobal(foobar)==true) then debugger.break;

This script code could be implemented by a debugger proactively setting a conditional breakpoint, or it could be implemented like an assert, for example.

In this scenario E source code example, control flow during execution of the compiled code 132 depends on debugger state, not on debuggee process 320 state in a conventional sense. If the debugger has traced less than 10000 values then trace a variable foovar (per the first line of the source code) or trace a routine foofcn( ) (per the second line of source code), otherwise don't trace:
   if debugger.tracePointCount( )<10000 then debugger.trace(foovar);
   if debugger.tracePointCount( )<10000 then debugger.trace(foofcn( ));

More generally, in some embodiments the debugger script statement includes a control flow statement 476 which is dependent on data 118 obtained 728 via the debugger 124.

In some embodiments, the debugger script uses runtime info such as the call stack 430 to conditionally control flow, to make debugging more efficient. In a scenario F example, the debugger script uses the debugger to access the call stack of a consumer thread at a point in the program's execution when the suspended consumer thread resumes execution, and to check whether foo( ) is on the thread's call stack at this point. If foo( ) is on the call stack as it should be, then the system continues executing the program. In a slight variation not shown in the source code below, the system optionally also reports that foo( ) was on the stack, e.g., by printing to a display or to a log file. But if foo( ) is not on the call stack, then thread execution hits a break so that the call stack and other program state can be examined in the debugger.

One example of source code embedded debug script for this scenario F is the following:

consumerState = debug.threadState(consumer);
if ((consumerState == runnable) or (consumerState == running)) {
   if (debug.searchStack(consumer, foo( )) != found) then debug.break;
}

Some other scenarios involve conditional breakpoints that are aware of each other's presence. In the following scenario G source code debug script, if a breakpoint X is set by execution of embedded debugger script, then two other breakpoints Y and Z are cleared as a consequence:
   X, Y, Z breakpoint; /declare breakpoint variables in embedded debug script . . . /debug script that sets or clears breakpoint X, and sets breakpoints Y, Z if (X.state == set) {
   Y.state = clear;
   Z.state = clear;
}

Other actions may also be taken by a given system 202 during program execution, based on whether the embedded script cleared or set a particular breakpoint. Automatically proactively setting or clearing breakpoints based on conditions that include whether other breakpoints were set or cleared allows rapid and efficient management of breakpoints. Using conditional breakpoints that are operationally dependent on one another's presences or states, a developer can build a powerful system. If breakpoints are set using scripting, other breakpoints set via scripting can be made operationally aware of them, and embedded script may do other things such as set or clear traces, and call debugging functions such as expression evaluation functions. Evaluation of variables is often easier to do in a debugger than outside of it.

Some embodiments include the computing system executing the compiled program code 132 in a program process 320. In some, the executing includes passing control 704 to the debugger, accessing 728 a call stack 430 of the program process in the debugger, and choosing 734 between a first operation and a second operation based on a value of the call stack.

A wide variety of software problems can be debugged using embedded debugger script. Some embodiments include a computing system 202 executing the compiled program code 132 in a program process 320, with the executing including at least one of the following debug circumstances.

The executing produces 730 in the program process a program process state 504 which is subject to a race condition 506, and as a result of the debugger instruction 308 the executing collects 732 at least a portion of the program process state in the debugger 124 or in a debugger trace 502.

The executing produces 730 in the program process a program process state 504 which is associated with an intermittent bug 508, and as a result of the debugger instruction 308 the executing collects 732 at least a portion of the program process state in the debugger 124 or in a debugger trace 502.

The executing produces 730 in the program process a program process state 504 which is associated with a deadlock 510, and as a result of the debugger instruction 308 the executing collects 732 at least a portion of the program process state in the debugger 124 or in a debugger trace 502.

The executing produces 730 in the program process a program process state 504 which is associated with a hanging thread 512, and as a result of the debugger instruction 308 the executing collects 732 at least a portion of the program process state in the debugger 124 or in a debugger trace 502.

The executing produces 730 in the program process a program process state 504 which is associated with an infinite loop 518, and as a result of the debugger instruction 308 the executing collects 732 at least a portion of the program process state in the debugger 124 or in a debugger trace 502.

The executing produces 730 in the program process a program process state 504 which is associated with an exception 516, and as a result of the debugger instruction 308 the executing collects 732 at least a portion of the program process state in the debugger 124 or in a debugger trace 502.

The executing produces 730 in the program process a program process state 504 which is associated with a security vulnerability 514, and as a result of the debugger instruction 308 the executing collects 732 at least a portion of the program process state in the debugger 124 or in a debugger trace 502.

The executing produces 730 in the program process a program process state 504 which occurs during a mutation test 520 of the source code, and as a result of the debugger instruction 308 the executing collects 732 at least a portion of the program process state in the debugger 124 or in a debugger trace 502.

In some embodiments, debugger script embedded in source code is designated by artificial intelligence 214. Some embodiments include an artificial intelligence (AI) mechanism 216 designating 736 the debugger script statement to be embedded in the source code. For example, after a body of source code examples that include embedded debug script becomes available, a machine learning model 216 may be trained using the examples. By using the trained model 216 and constraining the designated script statements to pass-control-and-return 418 statements 304, source code generated by a source generator can be configured for debugging 716 without a substantial performance loss and without unexpected interruption of program execution. In this and other contexts, performance profiling overlaps debugging as a software development activity, because tracing can be employed for either or both development activities.

In some embodiments, an AI mechanism learns via telemetry 478 which debugging operations involving specific API calls or specific call sites are performed for a set of developers, and the AI mechanism automatically generates scripting, such as breakpoints. In some embodiments, an enhanced compiler does this analysis and generates the scripting a compile time. In some embodiments, an enhanced system does the analysis and generates script at debug type. For instance, suppose debugger operations on behalf of a developer X stopped more than a threshold number of times to inspect the state of a certain object called through specific APIs. Then as a result, a debugger operating on behalf of a developer Y offers some or all of those breakpoints automatically and proactively. More generally, some embodiments reuse debugging telemetry 478 and pass it between debugging sessions 480 of different developers. Some embodiments include the debugger automatically and proactively setting or offering to set a breakpoint based at least in part on debugging telemetry 478 passed between debugging sessions 480 of different developers.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as source code 130 containing program statements 404 and embedded debugger script statements 304, compiled program code 132 containing debugger instructions 308 and program instructions 310, enhanced compilers 122, and enhanced debuggers 124, in the form of data 118 and instructions 116, read from a removable storage medium 114 and/or another source such as a network connection, to form a configured storage medium. The configured storage medium 112 is capable of causing a computer system 202 to perform technical process steps for providing or utilizing source-embedded debug script functionality 204, as disclosed herein. The Figures thus help illustrate configured storage media embodiments and process (a.k.a. method) embodiments, as well as system and process embodiments. In particular, any of the method steps illustrated in FIG. 6 or 7, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform a method 700 to perform a compilation 206 on a source code 130 which includes embedded debugger script 210. This method includes recognizing 302 in the source code a debugger script statement 304 written in a debugger scripting language 402 which has a debugger scripting language syntax 448; emitting 306 as part of a compiled program code 132 a debugger instruction 308 which implements the debugger script statement; and emitting 306 as part of the compiled program code a program instruction 310 which implements a program statement 404, the program statement written in a programming language 420 in the source code, the programming language having a programming language syntax 448 that is different from the debugger scripting language syntax 448.

In some embodiments, the method further includes at least one of: ascertaining 710 an absence 410 of debugger script 210 in a portion of the source code and in response to the ascertained absence enabling 726 a code optimization 406 during the compilation of the portion of the source code; or ascertaining 710 a presence 408 of debugger script 210 in a portion of the source code and in response to the ascertained presence disabling 724 a code optimization 406 during the compilation of the portion of the source code.

In some embodiments, the method further includes the following prior to completing the compilation: getting 738 at least a portion of the source code from a source code generator 212; and embedding 208 a pass-control-and-return 418 debugger script statement 304 in the portion of the source code.

In some cases, the compiled program code 132 of the source code from the source code generator 212 is free of any pass-control-and-obey 422 debugger script statement 304 debugger instruction 308. In these cases, no pass-control-and-obey 422 debugger script statement 304 is embedded by the source code generator 212, or else any embedded pass-control-and-obey 422 debugger script statement 304 is stripped out (e.g., commented out or removed) by a preprocessor before the source code is submitted to the compiler 122, or else any embedded pass-control-and-obey 422 debugger script statement 304 is treated by the compiler as a null or a no-op which does not cause the compiler to emit 306 any debugger instruction 308. A combination of these steps is also done in some embodiments to prevent inclusion of any pass-control-and-obey 422 debugger script statement 304 debugger instruction 308 in the compiled program code 132 of the source code from the source code generator 212.

In some embodiments, the method further includes the following prior to completing the compilation: embedding 208 in the source code a data read debugger script statement 304, 418 which upon execution reads 728 a data value via a debugger; and embedding 208 in the source code a control flow debugger script statement 304 which upon execution is dependent on the data value.

For instance, the source codes in scenarios B, D, E, F, and G herein each read 728 a data value via a debugger, and each of these scenarios includes a control flow debugger script statement 304 which upon execution is dependent on the data value. In these examples, the control flow debugger script statements 304 are if statements. Although not shown, in some embodiments other control flow debugger script statements 304 are used, such as switch statements or loop statements which likewise depend on data values obtained via a debugger.

In some embodiments, the method further includes embedding 208 in the source code at least one of the following three options: a debugger script statement which upon execution conditionally sets a breakpoint; a debugger script statement which upon execution conditionally clears a breakpoint; or a debugger script statement which upon execution sets a conditional breakpoint. These three options are discussed below.

As an example of the first option, the scenario B source code illustrates a debugger script statement which upon execution conditionally sets a breakpoint 426, which in effect makes that breakpoint a conditional breakpoint 424. In this case, the condition is part of the debug script embedded in the source code, as opposed to the third option discussed below.

As an example of the second option, the scenario G source code illustrates a debugger script statement which upon execution conditionally clears two breakpoints Y and Z.

As for the third option, some but not all debuggers 124 support both regular breakpoints that suspend program execution when they are encountered, and conditional breakpoints 424 that test a condition when they are encountered and then suspend program execution if and only if the condition is satisfied. The conditional breakpoint can be specified in such debuggers with or without use of source-embedded debug script. Other debuggers only support regular breakpoints.

In a scenario H source code, an example debug script statement 304 specifying a conditional breakpoint with a condition "j<0" is:
  debug.break(j<0);
The foregoing statement 304 instructs a debugger which supports conditional breakpoints to set a conditional breakpoint. The foregoing statement is more concise, and likely more performance efficient, than the alternative:
  if (j<0) then debug.break
However, the alternative does allow developers to obtain the functionality of conditional breakpoints when a debugger itself does not provide such functionality.

Additional Observations

Additional support for the discussion of source-embedded debug script functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present innovations, has no role in interpreting the claims presented in this patent disclosure. With this understanding, which pertains to all parts of the present disclosure, examples and observations are offered herein.

Some embodiments use or provide a system for embedding debugging scripting within debuggable code. In some, rich debugger statements 304 are embedded within the same source code as a programming language, such as C, C++, or other programming languages 420. As the code is debugged, the debugger is managed using these scripts. The debugging scripts can be updated by modifying the C/C++ code.

Some embodiments provide an interactive interface to the code, without invalidation requirements. That is, after a debugger instruction 308, 422 in the compiled code passes control to the debugger, the developer can use the debugger directly, without changing the program source or debugger script. In that sense, the debugger instruction 308, 422 operates as a debugging hook if at least a portion of the code is compiled as a debug build.

In some embodiments, failure by a debugger to recognize a debugger instruction results in the debugger treating the debugger instruction as a null or no-op, and continuing as if the unrecognized instruction was not encountered.

In some embodiments, a main compiler component per se does not emit debugger instructions in compiled code 132.

Instead, a compiler module in the debugger reads the source code, instructs the debugger accordingly, and the debugger executes based on the embedded debugger script.

In some embodiments, the scripting language is a Turing Complete language. In some cases the compiler transformation on the debugging script is not static, and in some the debugger operations performed at debug time and run time are not limited to operations which are documented within the debug script.

In some embodiments, debugger script statements and their corresponding debugger instructions are placed to not interfere with a system's real time performance, e.g., in locations that are not critical to the system's communication with other devices. In some embodiments, suitable placement avoids placing any pass-control-and-obey debug script statements, avoids placing pass-control-and-return debug script statements which take more than a specified time to execute, avoids placing debug script statements immediately before communications with other devices, or a combination thereof.

For example, the system 202 may be an embedded system such as an Internet of Things system. "IoT" or "Internet of Things" means any networked collection of addressable embedded computing or data generation or actuator nodes. An individual node is referred to as an internet of things device 101 or IoT device 101 or internet of things system 102 or IoT system 102. Such nodes are examples of computer systems 102 as defined herein, and may include or be referred to as a "smart" device, "endpoint", "chip", "label", or "tag", for example, and IoT may be referred to as a "cyber-physical system". In the phrase "embedded system" the embedding referred to is the embedding a processor and memory in a device, not the embedding of debug script in source code.

IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage-RAM chips or ROM chips provide the only local memory; (e) no CD or DVD drive; (f) being embedded in a household appliance or household fixture; (g) being embedded in an implanted or wearable medical device; (h) being embedded in a vehicle; (i) being embedded in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

Technical Character

The technical character of embodiments described herein will be apparent to one of ordinary skill in the art, and will also be apparent in several ways to a wide range of attentive readers. Some embodiments address technical activities such as lexically analyzing and parsing source code 130 to recognize 302 a debug script statement 304, lexically analyzing and parsing source code 130 to recognize 602 a program statement 404, emitting 306 instructions 308 and instructions 310 from a compiler 122 during a compilation 206, and executing 702 instructions 308 and instructions 310, which are each an activity deeply rooted in computing technology. Some of the technical mechanisms discussed include, e.g., compilers 122, program code optimizers 312, debuggers 124, source generators 212, and artificial intelligence mechanisms 216. Some of the technical effects discussed include, e.g., inclusion of debug script control statement 476 instructions 308 in code 132 emitted 306 during compilation 206, selective 724 or 726 performance optimization 406 of portions of code 132, generation through compilation of compiled code 132 in which a portion is performance optimized 406 and another portion is tailored for debugging step 468 operations 472, modification 208 of source code generated by a source generator mechanism 212 to include pass-control-and-return 418 debug script statements without including any pass-control-and-obey 422 debug script statements, greater control and efficiency which facilitate debugging difficult bugs such as intermittent bugs 508 or bugs involving a race condition 506, and other enhancements of compiler 122 technology, debugger 124 technology, or both technologies. Thus, purely mental processes and activities limited to pen-and-paper are clearly excluded. Other advantages based on the technical characteristics of the teachings will also be apparent to one of skill from the description provided.

Compilation 206 is a technical activity which produces a lower-level software code from a higher-level software code, where "lower" means closer to a hardware architecture in terms of generality, portability, and/or executability on hardware which has that architecture. For example, a higher-level code such as a source code written in C#, PHP, Python®, or another programming language 420 is compiled to produce a lower-level code such as an assembly language code, intermediate language code, p-code, machine language or another binary code such as an executable code (Python is a mark of the Python Software Foundation). One of skill understands that software will not execute until it has been compiled (although distinctions can be made, for the purpose of whether an activity or item qualifies as part of computing technology, interpreters are a particular kind of compiler 122). Software such as a source code input to a compiler, software production by other software such as a compiler production of intermediate language code or binary code, and software execution of compiler-produced code 132 under debugger control or otherwise, are each a part of computing technology. Hence, compilers are part of computing technology, and the improvements to compilers 122 described herein are improvements to computing technology. Similar considerations apply to debuggers 124.

Different embodiments provide different technical benefits or other advantages in different circumstances, but one of skill informed by the teachings herein will acknowledge that particular technical advantages will likely follow from particular innovation features or feature combinations, as noted at various points herein. Any generic or abstract aspects are integrated into a practical application such as a compiler 122, a debugger 124, a source generator 212, or an integrated development environment tool 218.

Some embodiments described herein address technical challenges of computer technology, and more particularly technical challenges arising in the use of compilers and debuggers. Improvements in compiler functionality and debugger functionality lead to improvements in the performance, usability, security, and maintainability of software that is developed using the improved compiler functionality and the improved debugger functionality.

In some cases, the flexibility, power, accuracy, or reproducibility of debugging capabilities are enhanced by embedded debugger script functionality.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not.

Rather, the present disclosure is focused on providing appropriately specific embodiments whose technical effects fully or partially solve particular technical problems, such as how to reduce the impact of human-computer (developer-debugger) interaction on the behavior of a debuggee program, particularly when debugging a program 320 that may be subject to a race condition 506, how to consistently and accurately document in human-legible and versioned manner relationships between debugger commands 432 and a debuggee program, how to reduce developer time and computational resources 412 spent by cycling between a debug version of a program and a performance-optimized version of a program, and how to obtain debugger-provided state information in situations for which manually directed debugging is difficult or undesirable, e.g., with code 132 compiled from source generated by a source generator 212, with code 132 that is JIT-compiled 428, or with code 132 which runs in an internet of things device 101 or in an embedded system 101. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, tools, peripherals, software process flows, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.
ALU: arithmetic and logic unit
API: application program interface
AST: abstract syntax tree
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
ID: identification or identity
IDE: integrated development environment
IL: intermediate language
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud 134 may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" 320 is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Source-embedded debug script operations such as parsing and analyzing code to create compiler-internal data structure representations of a program for subsequent use in code generation 306, emitting 306 instructions 308 and 310 which implement statements 304 and 404, running 702 source generator software 212 or machine learning models 216, and many other operations discussed herein (whether recited in the Figures or not), are understood to be inherently digital. A human mind cannot interface directly with a CPU or other processor, or with RAM or other digital storage, to read and write the necessary data to perform the source-embedded debug script steps 700 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as accessing, ascertaining, attaching, awaiting, categorizing, checking, choosing, clearing, collecting, compiling, continuing, debugging, designating, determining, emitting, executing, generating, getting, optimizing, overriding, parsing, passing control, performing, preventing, producing, recognizing, setting, stepping, skipping (and accesses, accessed, ascertains, ascertained, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest. Example verbs listed here may overlap in meaning or even be synonyms; separate verb names do not dictate separate functionality in every case.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102
101 machine in a system 102, e.g., any device having at least a processor 110 and a memory 112 and also having a distinct identifier such as an IP address or a MAC (media access control) address; may be a physical machine or be a virtual machine implemented on physical hardware
102 computer system, also referred to as a "computational system" or "computing system", and when in a network may be referred to as a "node"
104 users, e.g., user of an enhanced system 202
106 peripheral device
108 network generally, including, e.g., LANs, WANs, software-defined networks, clouds, and other wired or wireless networks
110 processor or set of processors; includes hardware
112 computer-readable storage medium, e.g., RAM, hard disks
114 removable configured computer-readable storage medium
116 instructions executable with processor; may be on removable storage media or in other memory (volatile or nonvolatile or both)
118 digital data in a system 102; data structures, values, source code, and other examples are discussed herein
120 kernel(s), e.g., operating system(s), BIOS, UEFI, device drivers
122 compiler tool or compilation service; services are an example of tools
124 debugger tool or debugging service; services are an example of tools
126 display screens, also referred to as "displays"
128 computing hardware not otherwise associated with a reference number 106, 108, 110, 112, 114
130 source code as represented in a computing system 102
132 compiled code as represented in a computing system 102, that is, code generated from source code by a compiler
134 cloud, also referred to as cloud environment or cloud computing environment
202 enhanced computing system, i.e., system 102 enhanced with source-embedded debug script functionality as taught herein
204 source-embedded debug script functionality, e.g., software or specialized hardware which performs or is configured to perform steps 302 and 306, or step 722 with respect to categories 418 and 422, or both step 724 and step 726 during a compilation 206, or emitting 306 during a compilation 206 instruction(s) to perform step 728, or emitting 306 during a compilation 206 instruction(s) to perform step 732, or emitting 306 during a compilation 206 instruction(s) to perform step 734, or step 736, or emitting 306 during a compilation 206 instruction(s) to perform step 742, or any software or hardware which performs or is configured to perform a novel method 700 or a computational source-embedded debug script activity first disclosed herein 206 compile source code (performed by a compiler not a person); 206 also refers to compilation as a computational activity or computational event; one of skill recognizes that compilation is performed by software, not by people either mentally or with pen-and-paper; people manifestly lack the speed, accuracy, memory capacity, and specific processing capabilities required to perform compilation, as is evident for example in the decades of technical advances in compiler technology; a classic accomplishment in computing is to write a compiler source code for a compiler of a given programming language in that programming language and then compile that source code to produce a compiler—this is known as a self-hosting compiler, and would be pointless rather than praised if compilation was routinely done by mental processes alone 208 computational activity of embedding debugger script statement(s) in source code that also contains program statement(s); 208 also refers to the digital result of embedding 210 debugger script, also called "debug script", namely, one or more debugger script statements as represented in a computing system; unless stated otherwise, a single break statement or single assert statement does not by itself qualify as a debug script, although it may be part of a larger set of debug script statements; mental or pen-and-paper items do not qualify as debugger script herein 212 source code generator, also called "source generator"; generates source code, e.g., a component that plugs into a compiler and adds additional code to compilation; a computational mechanism, not a person 214 artificial intelligence, e.g., machine learning, expert system, or computational statistical model; human intelligence is not artificial intelligence 216 artificial intelligence mechanism; a computational mechanism employing artificial intelligence, not a person 218 tool in a computing system, e.g., software development tool, security tool, communication tool, etc.; computational and hence non-human 302 computationally recognize a debugger script statement in a file which also contains a program statement 404

304 debugger script statement, having syntax defined by a debugger scripting language; as represented in a computing system, not a mental or paper artifact 306 computationally emit an instruction 116, e.g., a debugger instruction 308 or a program instruction 310, e.g., by writing the instruction to a file or to volatile memory or to other memory 112 (which is hardware, not human memory); emitted instructions are typically lower-level code such as an assembly language code, intermediate language code, p-code, or some binary code such as an executable code 308 debugger instruction, as represented in a computing system; instructs operation of a debugger 124 or of a kernel 120 or a runtime environment on behalf of a debugger 124

310 program instruction, as represented in a computing system; instructs operation of a program process 320 or of a kernel 120 or a runtime environment on behalf of a program process 320

312 code optimizer; a computational mechanism within a compiler, or which is invoked by a compiler, to perform performance optimization 406

314 optimization controller; a computational mechanism within a compiler, or which is invoked by a compiler, to control an optimizer 312 and a portion of the compiler which produces code 132 that is tailored for debugging rather than for performance 316 debugger utilization configuration in a computing system 318 control of debugger utilization configuration 316, or control mechanism, e.g., settings, configuration variables, built-in configuration defaults 320 program process which runs compiled code 132 in a computing system; the same code 132 may be run multiple times as multiple corresponding processes 320

322 interfaces generally, or as noted in particular such as a user interface 322

402 debugger scripting language, also called "debug scripting language"; a non-natural language parsable by a compiler, having a syntax, which includes at least one debugger command 432 other than break 462

404 program statement having syntax defined by a programing language; as represented in a computing system, not a mental or paper artifact 406 performance optimization, e.g., common subexpression elimination, constant folding, constant propagation, expression simplification, function inlining, induction variable elimination, invariant expression hoisting, loop fusion, loop unrolling, tail recursive call replacement, or vectorization, or other optimizations which reduce code size, code execution time, or computational resource usage by executing code 408 debug script presence at or in a particular portion of a source code; a "portion" is a line, redefined number of lines, a syntactic block (e.g., loop body, function body), or part but not all of a file of source code; presence is an objective computational detection result, not a subjective or undeterminable characteristic 410 debug script absence at or in a particular portion of a source code; absence is an objective computational detection result, not a subjective or undeterminable characteristic 412 computational resource in a computing system, e.g., processor, memory, network bandwidth, electric power 414 usage of a computational resource in a computing system 416 execution speed of software; may be measured in wall clock time or processor cycles or both 418 pass-control-and-return category of debug script statements; also refers to such statements 420 programming language; a non-natural language parsable by a compiler, having a syntax, which includes at least one statement that is not recognized within a given computing system as a debugger command 432

422 pass-control-and-obey category of debug script statements; also refers to such statements 424 conditional breakpoint, as represented in a computing system 426 breakpoint generally, as represented in a computing system; a breakpoint 426 may be a conditional breakpoint 424 or an unconditional breakpoint 426

428 just-in-time compiler, also refers to just-in-time (JIT) compilation; compilation of part of a program which is performed during program execution after a previously compiled different part of the program has begun executing 430 call stack of a program process 320 or a portion thereof, e.g., a thread call stack, also called simply a "stack"; digital 432 debugger command, as represented in a computing system (not on paper or mental); a debug script statement includes zero or more debug commands, and typically includes at least one debug command; zero is permitted to allow debug statements that are not per se debugger commands, e.g., get-debugger-attachment-status, or get-list-of-available-debuggers 434 source of a debugger command, e.g., debugger GUI or enhanced compiler or code 132 emitted by enhanced compiler containing a debugger instruction 308; not a person per se 436 ahead-of-time compiler, also refers to ahead-of-time (AOT) compilation; not JIT compilation-AOT compilation is completed before the program being compiled has begun executing 438 memory allocation heap of a program process 320 or a portion thereof, e.g., a thread heap, also called simply a "heap"; digital 440 software routine 442 comment in a source code 444 reserved word in a debug script language or a programming language, or in both 446 debug script delimiter in a source code; digital 448 language syntax 450 difference in syntax of two languages 452 computational activity of parsing a source code, or a digital artifact resulting from the parsing, e.g., internal compiler data structure such as AST or symbol table 454 token in a parse 452

456 loop statement in a language 402 or 420; also called a "loop"

458 language semantic, especially the operational effect of a particular statement of the language upon execution 460 difference in semantics of two languages 462 break (suspension) in program execution, passes control to debugger user interface 464 break statement in a debug script 466 compiler intrinsic function, or invocation of a compiler intrinsic function in a source code 468 step in program execution, followed by passing control to debugger user interface 470 step statement in a debug script 472 debugger operation generally, that is, computational operation performed by a debugger 474 control, also referred to as flow control, or flow of execution control 476 control statement in a language 402 or 420

478 debug telemetry; digital data 480 debug session, as represented in a computing system 482 debug scripting language library; computational or digital data or both 502 debugger trace, or computational activity of creating or updating a trace; a trace is a digital record of computational activity of a program, the trace is stored outside the program 504 process state in a computing system, e.g., content of variables, call stack(s), heap(s), instruction pointer(s)

506 race condition in software 508 intermittent bug in software 510 deadlock in software 512 hanging thread in software 514 security vulnerability in software 516 exception in software 518 infinite loop in software 520 mutation test of software 522 debugger attachment status in a computing system, e.g., whether a debugger is attached, and optionally characteristics of the debugger that is attached 524 variable in software 600 flowchart; 600 also refers to compilation methods that are illustrated by or consistent with the FIG. 6 flowchart 602 computationally recognize a program statement in a source code during compilation, e.g., by lexical analysis and parsing of source code 700 flowchart; 700 also refers to source-embedded debug script methods that are illustrated by or consistent with the FIG. 7 flowchart, which incorporates the FIG. 6 flowchart and other steps taught herein 702 computationally execute software, also referred to as running software 704 computationally pass control to or from a debugger 706 computationally override a debugger instruction, e.g., by changing a pass-control-and-obey statement into a trace statement 708 computationally skip a debugger instruction, e.g., by treating it as a null or no-op 710 computationally ascertain the absence or presence of debug script, e.g., based on a lexical analysis or parsing result 712 computationally attach a debugger to a debuggee process 320

714 computationally determine debugger attachment status 522

716 computationally perform a debugger operation 472, also referred to as debugging 718 computationally await a debugger command from one or more command sources 434

720 computationally determine whether a compiler is JIT or AOT 722 computationally categorize a debug script statement, e.g., as to category 418, category 422, or another category, e.g., control statement 476 or comment 442 may be respective categories 724 computationally prevent or disable code optimization 406

726 computationally perform or enable code optimization 406

728 computationally access data via debugger, i.e., in a debugger or by way of a debugger, or computationally access data via debug script, e.g., data (variable, routine call site, etc.) in a debug script library 482

730 computationally produce or reproduce a process state by execution of code 132, e.g., with regard to at least one or more variables, or a call stack, or a heap 732 computationally collect at least part of a process state, e.g., by copying one or more variables, or a call stack value, or a heap value 734 computationally choose between debugger operations based on a data value, e.g., by taking a particular debug script control flow path instead of a different debug script control flow path that is associated with a different data value 736 computationally designate a debug script statement to embed in a source code, e.g., by choosing between debug script statements or by embedding 208 a debug script statement 738 computationally get source code, e.g., using an API 740 computationally set a breakpoint 742 computationally clear a breakpoint 744 computationally check for the presence of a debugger, e.g., whether a particular debugger version is installed in a system or attached to a process, or whether a script-capable debugger is installed in a system or attached to a process, or whether a debugger having particular functionality 204 is installed in a system or attached to a process 746 any step or item discussed in the present disclosure that has not been assigned some other reference numeral; 746 may thus be shown expressly as a reference numeral for various steps or items or both, and may be added as a reference numeral (in the current disclosure or any subsequent patent application which claims priority to the current disclosure) for various steps or items or both without thereby adding new matter 748 computationally offer to set a breakpoint, e.g., via a user interface

CONCLUSION

In some embodiments, an enhanced compiler 122 recognizes 302 debug script 210 which is embedded 208 with program statements 404 in a source code 130, and emits 306 compiled code 132 containing various debugger command instructions 308 among program instructions 310. Embedded debug commands 432 are not limited to break statements 464 or assert statements. Different portions of a program's compiled code 132 are either tailored for debugging 472 or else performance optimized 406, depending on the location and kind of embedded debug script statements 304. Debugger commands 432 for debugging race conditions 506, intermittent bugs 508, mutation testing 520 code versions, and other complex development challenges are documented and versioned as part of the source code 130. Program process 320 execution paths are chosen 734, 474 based on call stack 430 search results, touch counts, breakpoint 426 status, and other data 118 accessed 728 via a debugger 124. Debug script statements 304 are categorized 722 and utilized to balance debugging support against performance optimization 406 in code 130 from a source generator 212, or in just-in-time 428 code.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system which is configured to embed a debugging hook into a compiled program code, the computing system comprising:
   a digital memory;
   a processor set including at least one processor, the processor set in operable communication with the digital memory;
   a compiler which upon execution by the processor set performs a compilation on a source code, the compilation comprising: recognizing in the source code a debugger script statement written in a debugger scripting language having a debugger scripting language syntax, recognizing in the source code a program statement written in a programming language which has a programming language syntax differing from the debugger scripting language syntax, emitting as part of the compiled program code a debugger instruction which implements the debugger script statement, and emitting as part of the compiled program code a program instruction which implements the program statement.

2. The computing system of claim 1, wherein the compiler comprises an optimizer which upon execution emits program instructions which are optimized with respect to execution speed or computational resource usage or both, and wherein the system further comprises at least one of:
   an optimization controller which upon execution ascertains an absence of the debugger script statement in a portion of the source code and in response to the ascertained absence enables a utilization of the optimizer during the compilation of the portion of the source code; or
   an optimization controller which upon execution ascertains a presence of the debugger script statement in a portion of the source code and in response to the ascertained presence disables a utilization of the optimizer during the compilation of the portion of the source code.

3. The computing system of claim 1, further comprising a program process that is running the compiled program code, the computing system also comprising a debugger utilization configuration control which is selectable between:
   a first configuration in which execution of the emitted debugger instruction results in the computing system passing control to a debugger which was previously attached to the program process;
   a second configuration in which execution of the emitted debugger instruction results in the computing system overriding or skipping an instruction to pass control to a debugger which was previously attached to the program process;
   a third configuration in which execution of the emitted debugger instruction results in the computing system determining no debugger is attached to the program process and then attaching a debugger to the program process and passing control to the debugger;

a fourth configuration in which execution of the emitted debugger instruction results in the computing system determining no debugger is attached to the program process and then continuing execution of the program process without attaching a debugger to the program process.

4. The computing system of claim 1, further comprising a debugger, and wherein the debugger script statement comprises at least one of:

a pass-control-and-return debugger instruction which upon execution results in the computing system passing control to the debugger, proactively performing a debugger operation, and then proactively returning control to the program process; or a pass-control-and-obey debugger instruction which upon execution results in the computing system passing control to the debugger, and the debugger waiting for a command from a debugger command source other than the program process.

5. The computing system of claim 1, further characterized in one of the following ways:

the compiler is a just-in-time compiler, and the debugger script statement is a pass-control-and-return debugger script statement which upon compilation and execution results in the computing system passing control to the debugger, proactively performing a debugger operation per the debugger script statement, and then proactively returning control to the program process; or the compiler is an ahead-of-time compiler, the debugger script statement is a pass-control-and-obey debugger script statement which upon compilation and execution results in the computing system passing control to the debugger, and the debugger waiting for a command from a debugger command source other than the program process.

6. A method performed by computing system to perform a compilation on a source code which includes embedded debugger script, the method comprising:

recognizing in the source code a debugger script statement written in a debugger scripting language having a debugger scripting language syntax;

recognizing in the source code a program statement written in a programming language which has a programming language syntax differing from the debugger scripting language syntax;

emitting as part of a compiled program code a debugger instruction which implements the debugger script statement; and emitting as part of the compiled program code a program instruction which implements the program statement.

7. The method of claim 6, wherein recognizing in the source code the debugger script statement comprises at least one of the following:

recognizing the debugger script statement in a programming language comment in the source code;

recognizing a debugger scripting language reserved word in the source code;

recognizing a debugger scripting language delimiter in the source code;

recognizing in the source code a difference between a debugger scripting language syntax and a programming language syntax;

recognizing a semantic difference between the debugger scripting language and the programming language; or recognizing a debugger scripting language token in a parse of the source code.

8. The method of claim 6, further comprising selectively optimizing the compiled program code based the debugger script statement, wherein selectively optimizing comprises at least one of the following:

categorizing the debugger script statement as a break statement or a step statement, preventing optimization of a next programming language statement after the debugger script statement, and optimizing other programming language statements of the source code; or categorizing the debugger script statement as a pass-control-and-return debugger script statement, and optimizing a next programming language statement after the debugger script statement.

9. The method of claim 6, further comprising selectively optimizing the compiled program code based the debugger script statement, wherein selectively optimizing comprises at least one of the following:

preventing optimization of a next programming language loop statement after the debugger script statement, and optimizing other programming language statements of the source code; or preventing optimization of a next routine which is called after the debugger script statement, and optimizing other programming language statements of the source code.

10. The method of claim 6, wherein the debugger script statement comprises a control flow statement which is dependent on data obtained via the debugger.

11. The method of claim 6, further comprising at least one of:

the computing system executing the compiled program code in a program process, wherein the executing comprises: passing control to the debugger, accessing a call stack of the program process in the debugger, and choosing between a first operation and a second operation based on a value of the call stack;

the debugger automatically and proactively setting or offering to set a breakpoint based at least in part on debugging telemetry passed between debugging sessions of different developers; or the computing system executing the compiled program code in a program process, wherein the executing comprises a debug instruction accessing a debug scripting language user interface library.

12. The method of claim 6, further comprising the computing system executing the compiled program code in a program process, wherein the executing comprises at least one of the following:

producing in the program process a program process state which is subject to a race condition, and as a result of the debugger instruction collecting at least a portion of the program process state in the debugger or in a debugger trace;

producing in the program process a program process state which is associated with an intermittent bug, and as a result of the debugger instruction collecting at least a portion of the program process state in the debugger or in a debugger trace;

producing in the program process a program process state which is associated with a deadlock, and as a result of the debugger instruction collecting at least a portion of the program process state in the debugger or in a debugger trace;

producing in the program process a program process state which is associated with a hanging thread, and as a result of the debugger instruction collecting at least a portion of the program process state in the debugger or in a debugger trace;

producing in the program process a program process state which is associated with an infinite loop, and as a result of the debugger instruction collecting at least a portion of the program process state in the debugger or in a debugger trace;

producing in the program process a program process state which is associated with an exception, and as a result of the debugger instruction collecting at least a portion of the program process state in the debugger or in a debugger trace;

producing in the program process a program process state which is associated with a security vulnerability, and as a result of the debugger instruction collecting at least a portion of the program process state in the debugger or in a debugger trace; or producing in the program process a program process state which occurs during a mutation test of the source code, and as a result of the debugger instruction collecting at least a portion of the program process state in the debugger or in a debugger trace.

13. The method of claim 6, further comprising an artificial intelligence mechanism designating the debugger script statement to be embedded in the source code.

14. The method of claim 6, wherein recognizing in the source code the debugger script statement comprises recognizing a compiler intrinsic function in the source code.

15. The method of claim 6, further comprising executing the debugger instruction which implements the debugger script statement in the compiled program code, and passing control to a debugger as a result of at least the executing.

16. A computer-readable storage device configured with data and instructions which upon execution by a processor cause a computing system to perform a method to perform a compilation on a source code which includes embedded debugger script, the method comprising:

recognizing in the source code a debugger script statement written in a debugger scripting language having a debugger scripting language syntax;

emitting as part of a compiled program code a debugger instruction which implements the debugger script statement; and emitting as part of the compiled program code a program instruction which implements a program statement, the program statement written in a programming language in the source code, the programming language having a programming language syntax differing from the debugger scripting language syntax.

17. The computer-readable storage device of claim 16, wherein the method further comprises at least one of:

ascertaining an absence of debugger script in a portion of the source code and in response to the ascertained absence enabling a code optimization during the compilation of the portion of the source code; or ascertaining a presence of debugger script in a portion of the source code and in response to the ascertained presence disabling a code optimization during the compilation of the portion of the source code.

18. The computer-readable storage device of claim 16, wherein the method further comprises the following prior to completing the compilation:

getting at least a portion of the source code from a source code generator; and embedding a pass-control-and-return debugger script statement in the portion of the source code.

19. The computer-readable storage device of claim 16, wherein the method further comprises the following prior to completing the compilation:

embedding in the source code a data read debugger script statement which upon execution reads a data value via a debugger; and embedding in the source code a control flow debugger script statement which upon execution is dependent on the data value.

20. The computer-readable storage device of claim 16, wherein the method further comprises embedding in the source code at least one of:

a debugger script statement which upon execution conditionally sets a breakpoint;

a debugger script statement which upon execution conditionally clears a breakpoint; or a debugger script statement which upon execution sets a conditional breakpoint.

\* \* \* \* \*